United States Patent
Hansen

(10) Patent No.: US 6,178,719 B1
(45) Date of Patent: Jan. 30, 2001

(54) CROSS JOINING AND/OR CROSS CUTTING DEVICE IN A PACKAGING MACHINE OF THE FLOW PACKING TYPE

(75) Inventor: Per Henrik Hansen, Malling (DK)

(73) Assignee: Tetra Pak Hoyer A/S, Højbjerg (DK)

(*) Notice: Under 35 U.S.C. 154(b), the term of this patent shall be extended for 0 days.

(21) Appl. No.: 09/297,060
(22) PCT Filed: Nov. 3, 1997
(86) PCT No.: PCT/DK97/00498
  § 371 Date: Apr. 29, 1999
  § 102(e) Date: Apr. 29, 1999
(87) PCT Pub. No.: WO98/19915
  PCT Pub. Date: May 14, 1998
(51) Int. Cl.[7] ................................................ B65B 51/10
(52) U.S. Cl. .......................... 53/374.4; 53/550; 53/374.6
(58) Field of Search ................................ 53/374.4, 374.5, 53/374.6, 550, 551

(56) References Cited

U.S. PATENT DOCUMENTS

| | | | |
|---|---|---|---|
| 5,371,999 | * 12/1994 | Hansen et al. | 53/374.6 |
| 5,628,163 | * 5/1997 | Keopple et al. | 53/374.4 |
| 5,771,660 | * 6/1998 | Loewenthal | 53/374.6 |

FOREIGN PATENT DOCUMENTS

| | | |
|---|---|---|
| 2 126 953 | 12/1971 | (DE) . |
| 0 290 105 | 11/1988 | (EP) . |
| 0 725 007 | 8/1996 | (EP) . |
| 2 247 000 | 2/1992 | (GB) . |

* cited by examiner

*Primary Examiner*—Eugene Kim
(74) *Attorney, Agent, or Firm*—Nixon Peabody LLP; David S. Safran

(57) ABSTRACT

In a cross joining and/or cross cutting station in a flow packing machine, opposed tool parts are moved in complementary round paths such that they can press against opposite sides of a tubular packaging web for cross closing/cutting the web between successively advanced products therein, during continuous movement of the web. Normally the tool parts are moved by simple rotation, but according to the invention they are moved in a paracyclic manner, i.e. with substantially unchanged orientation in the space. This makes it possible to maintain the tool carrying parts in operative connection with an external power source through flexible wires or hoses, such that in a packaging machine with more packaging lines it is possible to operate all of the tool sets by common moving means, yet also with the possibility of deactivating the tools individually in case of operational disturbances in one or more of the lines. With such an individual deactuation of the tools it is achievable in a desirable manner that the tools will stop their advancing action on the packaging web in the faulty line.

2 Claims, 3 Drawing Sheets

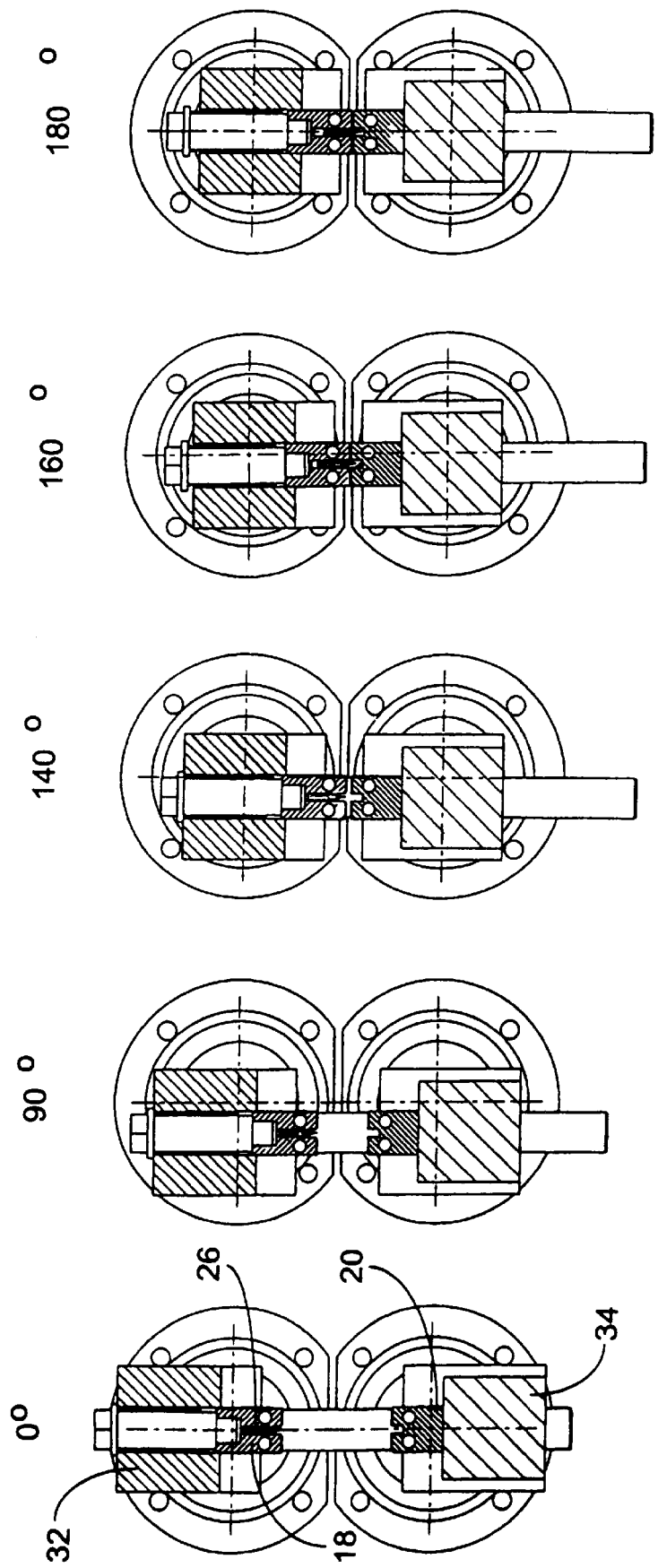

Figure 1:
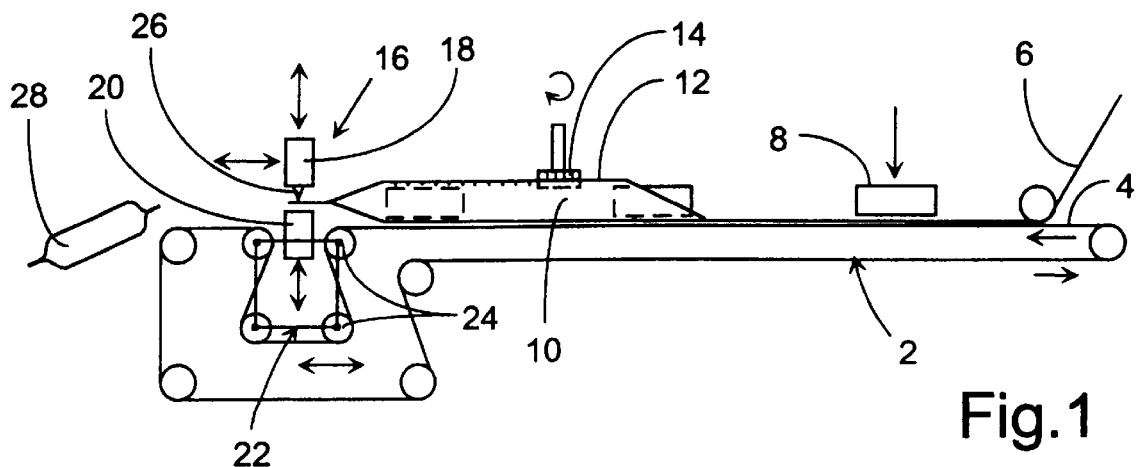

CROSS JOINING AND/OR CROSS CUTTING DEVICE IN A PACKAGING MACHINE OF THE FLOW PACKING TYPE

The present invention concerns a device for cross joining and/or cross cutting of a moving web of paper or foil, especially in packaging machines for the flow-packing of mutually separated items such as consumer ice products, comprising a clamping tool which is moved in a circular path, possibly containing a knife to carry out a cut from the one side of the path towards an opposite and similarly circularly-rotated counter-tool at the other side of the path. These tool parts are typically arranged in a counter-rotating manner, so that they can be pressed towards each other during mutual advancement in a common movement section at the same rate of movement as that at which the product web is advanced. With flow-packing, this advancement is effected primarily by the influence of a driven pair of welding- or stamping-rollers which are used for the formation of a longitudinal assembly seam in the web of paper of foil, which is folded up to form a tubular holster around the products which are placed at mutual intervals on the web. The same tubular holsters must subsequently be cross-joined or cross-cut in the free areas between the products in the formation of individually packaged items, and it is well-known that the aforementioned rotating tool parts can effect both of these tasks, in that the knife holder can be configured as a welding tool or stamping tool for co-operation with a correspondingly-configured anvil, i.e. so that a cross-cut can be produced midway between a welding-together or stamping-together area provided at the same time, and which in one operation closes the rear end of the holster for the leading product and the front end of the holster for the following product.

The said rotating tool parts must naturally be moved synchronously with the advancement of the packaging web.

In packaging plants of the type considered, there will often exist-several parallel packaging lines in order to achieve a high capacity, and it is hereby advantageous that the said tool parts for all of the webs can commonly be placed on oppositely- and transversely-disposed rotation arrangements. On the other hand, there can thus arise the problem that the tool parts continue to effect their independent advancement function on all of the webs, even though situations arise in which, because of an operational failure, it could be desirable to completely stop the advancement of one of the webs, e.g. for the carrying out of a local repair. That or the remaining advancement functions for the relevant web should be able to be deactivated separately, but since the cutting-over advancement continues to work, the material web will nevertheless not be completely disengaged.

According to the invention, it is hereby a principal consideration that in such multi-line plants there should be provided means for the temporary and selective deactuation of the advancement function which is effected on the web material by the said tool parts in the individual sections.

This is difficult to achieve with purely rotating systems with common drive, but with the invention is realized that this desirable function is achieved in a relatively simple manner if the relevant rotating function is replaced by a system with paracyclic movement, whereby the tool parts are rotated in their movement paths with substantially unchanged orientation in the space. Both the cutting and the advancement action will be the same as with the rotating system, but now with the practical possibility that the tool parts can be in connection with changeover means with control connections in the form of cables or hoses respectively to or rather from such power sources which, when required, can be used to effect a local displacement of the tool parts in such a manner that these can be retracted to positions in which they will not be able to cooperate in the action on the intervening web material during their continued circular movement.

The tool parts, or just one of the tool parts, can thus be mounted in a movable manner in a holder which continues to participate in the circular movement, so that the basic simplicity of the common drive-system can be totally maintained. It must be emphasized that the primary object of the invention is to provide the possibility for deactuation of the advancing action which normally takes place in connection with cross joining/cut-ting, and that it is not the cross-cutting function seen solely in itself which is desired to be deactuated, in that this almost per definition will not constitute any hindrance for an easy removal of the web material from the relevant packaging line.

Figure 2A:
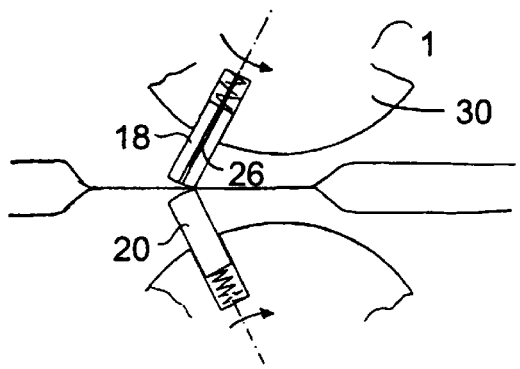
Figure 4:
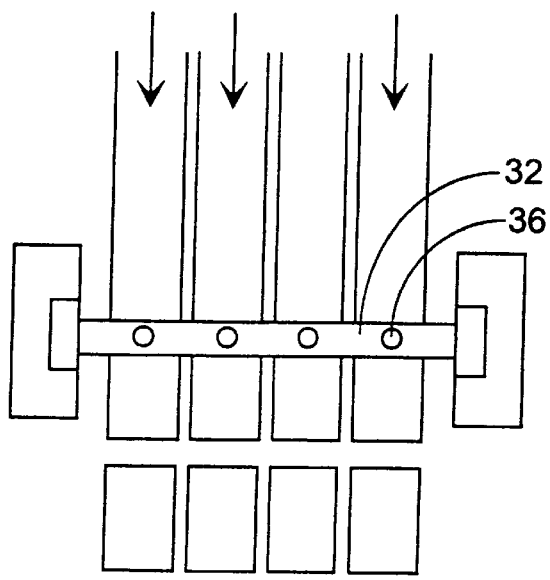
Figure 5:
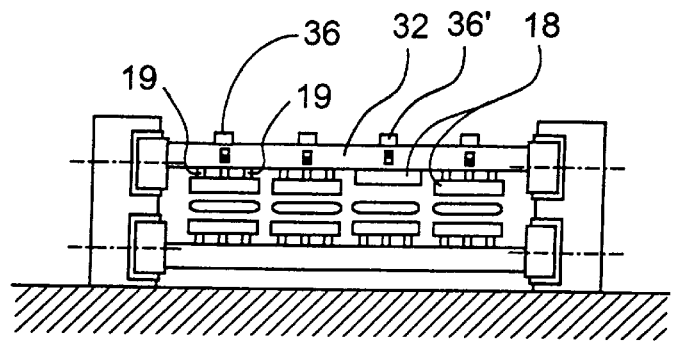
Figure 6:
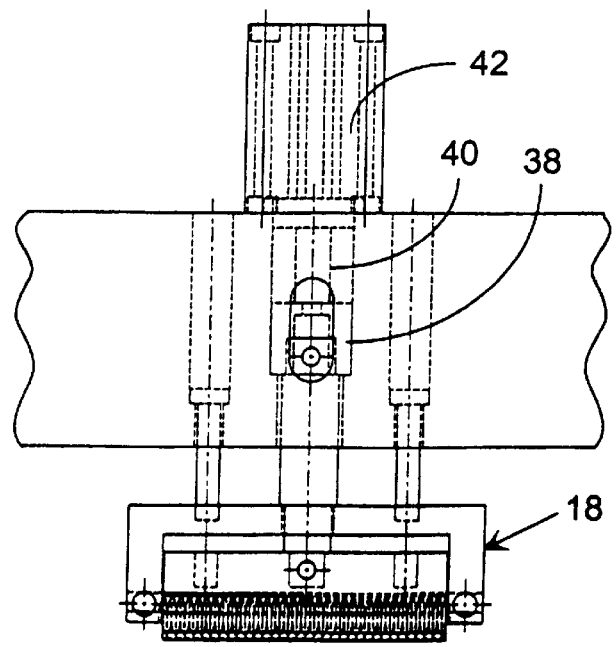

The invention will now be described in more detail with reference to the drawing, in which FIG. 1 is a schematic view of a known flow-packing line, FIG. 2a)–c) illustrate an associated, known cross-joining and cutting mechanism seen in different positions, FIG. 3a)–e) are corresponding illustrations of a mechanism according to the invention, FIG. 4 is a plan view of a multi-line packaging plant according to the invention, FIG. 5 is the same seen from the front, and FIG. 6 is a detail front view of a tool part therein.

In FIG. 1 is shown a flow-packing line with a conveyor belt 2 on the upper side 4 of which there is laid a web 6 of paper or foil which, during its movement forwards, receives individual items 8 which are supplied from a delivery station at suitable intervals, so that the items are deposited on the upper side 4 of the conveyor belt with a given mutual distance between them. By means of fixed, not-shown folding-up tools, there is effected a folding-up and folding-in of the freely projecting side parts 10 of the web 6 in the formation of a tubular holster around the items 8, and the upper edges 12 of the oppositely-facing web sides are pressed or welded together by means of oppositely-facing, driven stamping or welding rollers 14 for the longitudinal closing of the tubular holster.

The packaging web is then advanced further to a cross-joining station 16 in which a pair of tool jaws 18 and 20 are moved in towards each other in the vertical direction for local clamping together of the holster midway between two items 8, and simultaneously during common horizontal movement in the direction in which the web is advanced. As indicated by the arrows a and b, these are reciprocating movements, so that the tools can continuously process the holster between each pair of progressively-fed items 8. The lower tool 20 is mounted in connection with a horizontally-reciprocating carriage 22 which has reversing rollers 24 for the guiding of the belt 4 in a loop underneath this tool.

The one of the tools 18 and 20, here 18, is configured with a knife part 26 which, when the tools are brought together, can effect a cross-cutting of the holster pressed flat between the tools -with the view to the delivery of cut-off and fully-packaged items 28.

Figure 2B:
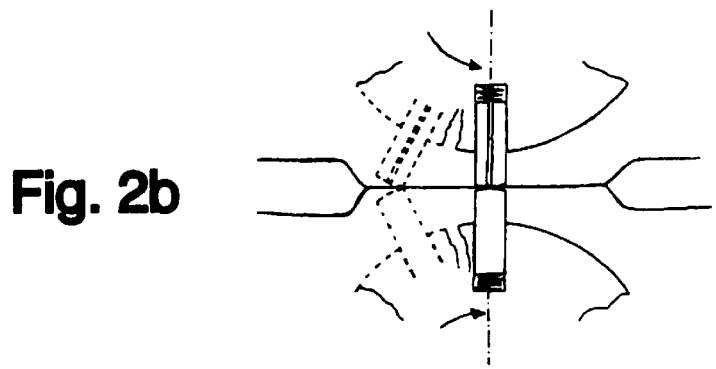
Figure 2C:
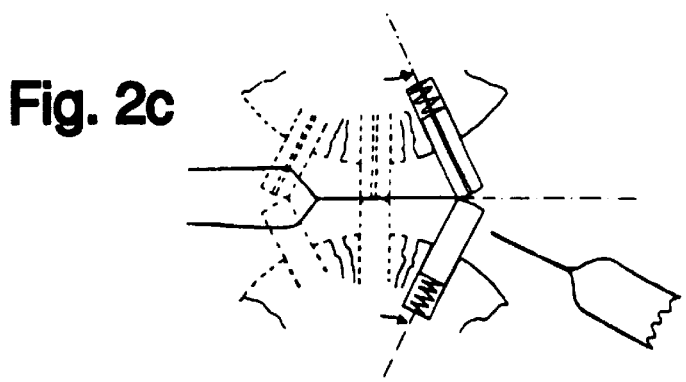

There can exist machine embodiments whereby the vertical and the horizontal movements of the tools 18 and 20 can be controlled individually, but here there is to be considered a simpler embodiment whereby the tools are moved in a generally non-adjustable manner, i.e. merely by a purely circular guide. The associated conventional technique is illustrated in FIG. 2, which shows the tools following a simple rotation pattern. They are disposed extending out from respective rotating axles 30, whereby with synchronous operation of said axles they will execute the required vertical and horizontal movements, and will come together precisely in connection with the advancement of the web 6 in between the items 8.

The rotating tools 18 and 20 will thus contribute towards the advancement of the web 6, in that during their common movement they are pressed in a flexible manner into the axle 30, whereby a knife 26 in the tool 18 becomes operative for the cross-cutting of the web in a middle-most phase of that stamping-together of the web which the tools will execute on both sides of the cutting line. Especially in the case of a mullet-line plant with common axle, it will not be practically possible to arrange a deactivation of a given set of tools, which will thus continue their advancement action even though the roller drive 14 and the belt 4 are made inoperative.

With the invention cf. FIG. 3, the tools 18 and 20 are placed in holders 32 and 34 which are arranged on or directly constitute transverse beams having their ends connected with cams which, by surrounding, rotating eccentric bushes are made to execute a paracyclic movement as illustrated in a sequence of 180° in FIG. 3. In principle, the effect herewith will be just as in FIG. 2, i.e. where the tools from an open position, in which they allow the passage of the next item for cutting off (FIG. 3a), are brought together for closing (FIG. 3c), stamping together of the tubular web (FIG. 3d–e) and cross-cutting of this (FIG. 3e). During the sequence from 140° (FIG. 3c) and all the way forward to 220° (i.e. after FIG. 3e), a simultaneous transport of the material web will be effected to the right, again corresponding to FIG. 2.

However, compared with FIG. 2 there is the very great difference that the tools and their holders do not execute a rotation, but solely the aforementioned paracyclic movement, whereby it is practically possible to install externally-controllable retraction means such as changeover cylinders at any of the individual tools, but in practice at only the one tool. In FIGS. 4 and 5, such means are shown arranged above the upper beam 32 in the form of control cylinders 36, by means of which the knife tools 18 can be raised to an inactive position in which during continued movement they are unable to establish clamping of the web material. In FIG. 5, such a raising of the tool is shown by 36'.

It will be understood that it will not pose any problems in principle to arrange individual pressure-medium hoses for the cylinders 36, since these hoses will be exposed only to rocking movements of a limited extent.

FIG. 6 shows in more detail an example embodiment where a stamping tool 18 is housed in a holder 38 which is pressed to a bottom position by a piston rod 40 from a cylinder 42, and in which the tool can carry out its operative movements under elastic upwards displacement in the holder 38. Activation of the cylinder 42 will raise the holder 38 and herewith the tool to the inoperative position.

It should be noted that in principle the relevant group of changeover tools will be able to cooperate with counter-tools housed in accordance with FIG. 2.

What is claimed is:

1. Device for at least one of cross joining and cross cutting of packaging webs in a packaging machine, comprising:

multiple sets of cooperating tools, means for moving each of the sets of cooperating tools in complementary orbital paths, the cooperating tools of each set also being moved by said means for moving between an open position in which the cooperating tools are separated from each other for enabling the passage of a packaging item therebetween and an operative position in which the cooperating tools have been brought together against the packaging webs in a space between packaging items while executing a co-movement in a direction of advancement of the packaging webs at the same time, and a holder for holding each of said cooperating tools, said holder being selectively actuatable for preventing clamping-together of the respective set of cooperating tools as the tools move around said orbital paths.

2. Device according to claim 1, further comprising a guide part which guides movement of said cooperating tools in said orbital path, while maintaining at least one of said cooperating tools in a substantially unchanged orientation; wherein each holder means is mounted on said guide part for movement along said orbital path; and wherein said means for individually deactivating the holder means comprises selectively operable power supply means connected to changeover elements of said holder means by flexible wires or hoses.

* * * * *